(12) United States Patent
Rößl et al.

(10) Patent No.: US 10,198,603 B2
(45) Date of Patent: Feb. 5, 2019

(54) TIME SLOT COMMUNICATION SYSTEM

(71) Applicant: SES-IMAGOTAG GMBH, Graz (AT)

(72) Inventors: Andreas Rößl, Graz (AT); Andreas Hechenblaickner, Graz (AT); Christian Frießnegg, Graz (AT)

(73) Assignee: SES-IMAGOTAG GMBH, Graz (AT)

( * ) Notice: Subject to any disclaimer, the term of this patent is extended or adjusted under 35 U.S.C. 154(b) by 0 days.

(21) Appl. No.: 16/111,573

(22) Filed: Aug. 24, 2018

(65) Prior Publication Data

US 2018/0365454 A1    Dec. 20, 2018

Related U.S. Application Data

(63) Continuation of application No. 15/702,043, filed on Sep. 12, 2017, now Pat. No. 10,068,113, which is a continuation of application No. 15/119,259, filed on Aug. 16, 2016, now Pat. No. 9,792,468.

(51) Int. Cl.
*G06K 7/10* (2006.01)
*G06Q 30/02* (2012.01)

(52) U.S. Cl.
CPC ..... *G06K 7/10029* (2013.01); *G06K 7/10039* (2013.01); *G06Q 30/02* (2013.01)

(58) Field of Classification Search
CPC ............ G06K 7/0008; G06K 7/10019; G06K 7/10029; G06K 7/10356; G06K 7/10039; G06K 19/0723

USPC ......................................................... 340/10.2
See application file for complete search history.

(56) References Cited

U.S. PATENT DOCUMENTS

| | | | |
|---|---|---|---|
| 8,525,642 B2 * | 9/2013 | Tubb | E05B 39/00 340/5.73 |
| 2017/0011238 A1* | 1/2017 | Ro L | G06K 7/10029 |

* cited by examiner

*Primary Examiner* — Mark S Blouin
(74) *Attorney, Agent, or Firm* — Dennemeyer & Associates LLC

(57) ABSTRACT

A system, exhibiting a communication station for communicating with a number of radio tags in a time slot communication process, in which a number of time slots per time slot cycle in a repeating sequence are available for communication, and each time slot is characterized by a distinct time slot symbol, wherein the communication station is designed to send out a synchronization data signal exhibiting the time slot symbol for the currently present time slot, and wherein a radio tag is designed for changing from a sleep state into an active state at a wakeup instant, and for receiving the synchronization data signal in the active state and, if the received time slot symbol indicates a time slot intended for it, for defining a new wakeup instant corresponding to the next appearance of the time slot intended for it in a time slot cycle that follows the currently present time slot cycle.

8 Claims, 7 Drawing Sheets

TIME SLOT COMMUNICATION SYSTEM

CROSS-REFERENCE TO RELATED APPLICATIONS

This application is a continuation of U.S. patent application Ser. No. 15/702,043, filed Sep. 12, 2017, allowed, which is a continuation of U.S. patent application Ser. No. 15/119,259, filed Aug. 16, 2016, now U.S. Pat. No. 9,792,468, which is a national phase application of PCT/EP2014/053376, filed Feb. 20, 2014, all of which are incorporated in full in this application as if set forth in its entirety herein.

DESCRIPTION

Technical Field

The invention relates to a system for communicating with a radio tag.

Background

For example, a system mentioned at the outset is known from DE 44 39 074 A1. According to this document, all radio tags must be in their active state at the time a preamble is sent out, so as to enable a synchronous data transmission to the radio tag in time windows allocated thereto. This measure is associated with a low energy and system efficiency. Further known from WO 2010/004349 A1 is a system in which the radio tags are allocated to individual time slots. For purposes of synchronization with the communication station, the latter sends out a preamble. This preamble contains several data packets, which indicate a deviation from a reference instant for the synchronous state between the communication station and radio tag. At an instant that is defined by their internal time base and lies in the timespan within which the preamble appears, the radio tags pass from a sleep state to an active state, and thereupon receive one of the data packets. The internal time base in the radio tags is corrected using the respectively received data packets and the deviation from the reference instant coded therein, so as to reset the next wakeup instant, and thereby maintain a synchronous state with the communication station. However, the preamble used has proven itself disadvantageous, because it produces a relatively high data volume.

The object of the invention is to provide a system that avoids the problems enumerated at the outset.

SUMMARY OF THE INVENTION

This object is achieved by a system according to claim 1.

Therefore, the subject matter of the invention involves a system that exhibits a communication station for communicating with a number of radio tags in a time slot communication process, in which a number of time slots per time slot cycle in a repeating sequence are available for communication, and each time slot is characterized by a distinct time slot symbol, wherein the communication station is designed to send out a synchronization data signal exhibiting the time slot symbol for the currently present time slot, and wherein a radio tag is designed for changing from a sleep state into an active state at a wakeup instant, and for receiving the synchronization data signal in the active state and, if the received time slot symbol indicates a time slot intended for it, for defining a new wakeup instant corresponding to the next appearance of the time slot intended for it in a time slot cycle that follows the currently present time slot cycle.

The advantage to the measures according to the invention is that a synchronism between the communication station and a radio tag is detected, maintained and ensured during system operation in the easiest possible and yet extremely robust manner. As opposed to known measures, all radio tags now need no longer simultaneously be in their active state at a specific instant to remain synchronous with the time grid of the time slot communication process defined by the communication station. Data indicating a time deviation from a reference instant also need not be received and evaluated, which had proven to be very complicated with respect to the processing of these data and the data volume during communication with the communication station. According to the invention, it is enough for each radio tag that participates in communicating with the communication station to know about the time slot symbol indicating the time slot intended for it. Each of the radio tags is thus individually oriented to the appearance of a time slot symbol relevant to it, identifies the time slot symbol relevant to it, and defines its next wakeup instant, so as to with the timing of the time slot communication process prescribed by the communication station. It is here entirely sufficient that the time slot symbol clearly identify the respective time slot, e.g., with an individual time slot code for each time slot. Operating a radio tag synchronously with the communication station does not require coding additional information into the synchronization data signal, as explained in relation to the known measures. The radio tag determines its synchronism with the communication station solely by virtue of recognizing the time slot symbol that appears at the instant it expects or within an expectation time window, and displays the time slot intended for it.

After the radio tag has determined it synchronism as explained above, it is essentially sufficient for it to again switch into the sleep state, since the next wakeup instant is automatically known from the time window of the time slot communication process known to it. As a consequence, defining the new wakeup instant can be confined to restarting a time control stage (e.g., a timer) of the radio tag with the timing parameters already used beforehand for switching from the sleep state into the active state. The radio tag can thereafter again switch into the sleep state and reside there until the time controller again triggers a wakeup and switch from the sleep state into the active state at the new wakeup point in the next time slot cycle. However, the radio tag does not absolutely have to reside in the sleep state for the remainder of the time slot intended for it, but can rather also process additional tasks in an active state during the time slot or even the time slot cycle. The time controller discussed above then operates in the background, independently of its other activities. The new wakeup instant can be defined by determining an absolute or relative time indication, e.g., relative to the instant at which the synchronization data signal appears or relative to the instant at which the sleep state is again assumed after the active state or also relative to the instant at which the end of the synchronization data signal sets in. However, defining the new wakeup instant can also be construed to mean that the new wakeup instant is determined by the duration of the sleep state following the active state in which the time slot symbol was received or even by the sum of the sleep state and active state durations or also the sum of several such sleep state sequence durations. Since each radio tag operates its own time control stage and exemplary variabilities in the behavior of the respective electronic components cannot be ruled out, defining the new wakeup instant can also involve compensating for a drift in its time base that is individually present for each radio tag. To this end, for example, a time difference between the expected appearance of the synchronization data signal with the time slot symbol indicating the time slot intended for the respective radio tag and the actual appearance can be measured in the radio tag, and considered for correcting its timing in the time control stage. However, compensation takes place only if synchronism is determined. But if another time slot symbol was received in place of the expected time slot symbol, no synchronism is present, and the radio tag would have to perform a new synchronization, which will be discussed below.

In the time slot communication process, m time slots, e.g., 255 time slots, are used within n seconds, e.g., 15 seconds. The n seconds constitute a time slot cycle. In this time slot communication process, then, m time slots are available within a time slot cycle for communicating with the radio tags. Each of the radio tags can be allocated to one of the time slots, wherein several radio tags can also be allocated to a specific time slot.

A radio tag essentially exhibits a radio communication stage, also called a transceiver, and a logic stage that interacts with the latter, which provides the logical function of a tag. For example, the logic stage can be completely realized by hardware, or exhibit a microprocessor and memory modules or a microcontroller with integrated memory modules, making it possible to run software stored in the memory modules. A tag can receive a radio signal with its radio communication stage, process received data contained in the radio signal with the logic stage, and if necessary generate response data with the logic stage, and deliver the latter again as a radio signal via the radio communication stage. The radio communication stage exhibits means for radio communication and conversion of analog signals into digital signals and vice versa.

For purposes of power supply, such a radio tag can exhibit an energy storage device, e.g., a battery or solar panel coupled with a rechargeable battery. In order to operate as energy efficiently as possible, the radio tags exhibit different operating states. A radio tag exhibits a relatively high power consumption in the active state. For example, the active state is present when transmitting or receiving data, updating displays, measuring battery voltages, etc. By contrast, a relatively low power consumption is present in the sleep state. As many electronic components as possible are preferably separated or switched off from the power supply or at least operated in a mode with the lowest possible power demand. The active state is predominantly present in the time slot determined for the radio tag for communication with the communication station. In the active state, the radio tag exhibits a reception readiness, for example, so as to receive commands and potentially also reception data from the communication station, and process the latter with the help of the logic stage. In the active state, the logic stage can also be used to generate transmission data and communicate them to the communication station. Outside of the time slot intended for the radio tag, the radio tag is predominantly operated in the energy-saving sleep state. In the sleep state, the logic stage or time control stage only performs those activities required for timing to ensure timely wakeup, so that the radio tag is ready to receive the synchronization data signal and/or communicate with the communication station at the next time slot intended for it. In order to operate energy efficiently and thus achieve the longest possible service life for the radio tag, the underlying operating strategy is to keep the synchronous radio tag in the sleep state as long as possible, and only operate it in the active state for the shortest possible time span when absolutely necessary for data transmission with the communication station.

The communication station can be a self-contained, autonomous device with server functionality. The communication station will preferably form an interface between hard-wired communication, for example with a data processing device (e.g., a server), and wireless, radio-based communication with the radio tags.

In order to be available for communicating with the communication station, the radio tags can first be registered with the communication station or allocated to it.

Additional, especially advantageous embodiments and further developments of the invention may be gleaned from the dependent claims, as well as from the following description.

The measures according to the invention can be used not just to easily ensure the synchronism between the communication station and a radio tag, but also to return a radio tag that appeared in an asynchronous state into the time scheme of the time slot communication process without any problem, i.e., to again synchronize it. To this end, such an asynchronous radio tag switches from its sleep state into its active state not periodically, as would be the case in the synchronous state, but rather a single time at any instant desired, for example, and resides in this active state at reception readiness. If nothing has been received within a specific timespan, e.g., within a time slot duration, it again switches into the sleep mode, and repeats the attempt at reception at another instant. As soon as a synchronization data signal has been received, the time slot symbol is evaluated. In all probability, the time slot symbol here received indicates a time slot not intended for it, which is determined autonomously by the radio tag. The radio tag knows the systematics behind the appearance of the time slot symbols, and after evaluating the received time slot symbol can independently decide whether it can still expect the time slot intended for it in the present time slot cycle (first case) or only in the ensuing time slot cycle (second case). In the first case, the radio tag is designed to define a new wakeup instant in the currently present time slot cycle that corresponds to the next appearance of the time slot intended for it. By evaluating the received time slot symbol and knowing the systematics behind the appearance of the time slot symbols, the radio tag determined that the time slot intended for it will still appear in the currently present time slot cycle. In the second case, the radio tag is designed to define a new wakeup instant corresponding to the next appearance of the time slot intended for it in the time slot cycle that follows the currently present time slot cycle. By evaluating the received time slot symbol and knowing the systematics behind the appearance of the time slot symbols, the radio tag determined that the time slot intended for it will no longer appear in the currently present time slot cycle, because it already appeared in this time slot cycle in the past. As already explained at the outset with respect to the synchronous state, aforesaid time controller is also used for this type of definition for the new wakeup instant, wherein the time controller is now operated with the timing parameter with which the desired entry into the synchronous state is achieved. The timing parameter to be selected is derived by the radio tag from the inherent knowledge of the time slot communication process that is used; i.e., it is determined by the logic stage.

The correct wakeup instant for the respective radio tag is defined by the radio tag with knowledge of the parameters for the time slot communication process. These parameters can be queried by the radio tag during its registration by the communication station or transmitted to it, or already be programmed into the radio tag in advance. In both cases, it makes sense for the radio tag to exhibit a memory stage for storing the parameters of the time slot communication process, and for the radio tag to be designed to access and consider these parameters for defining the new wakeup instant. The parameters can represent all details involved in timing the time slot communication process, such as parameters relating to time sequences for communication between the communication station and the radio tag, parameters relating to predefined instants or time segments, but also parameters relating to the basic structure of the time slot communication process, e.g., number of time slots, duration of a time slot, duration of the time slot cycle, or also as parameters the explicitly indicated time slot symbols for identifying the individual time slots or also algorithms for calculating the time slot symbols. An asynchronous radio tag can use these parameters to autonomously and automatically easily clarify whether, based on the time slot symbol just received, the time slot intended for it can still be expected to be within the currently present time slot cycle, or whether the time slot intended for it already belongs to the past in the present time slot cycle, and thus the next time slot intended for it will only appear in the next time slot cycle. In the active state, the radio tag in question calculates the new wakeup instant, switches into the sleep state, and switches into the active state at the computed wakeup instant, receives the time slot symbol of the time slot intended for it, and thereafter again is in the synchronous state. If no other activities are expected of it in the present time slot, it only switches back into the active state in the next time slot cycle, so as to receive the synchronization data signal in the time slot intended for it.

In another aspect of the invention, the radio tag can exhibit a memory stage for storing a representation of the time slot symbol that indicates the time slot intended for it.

The two memory stages (memory stage for storing the parameters and memory stage for storing the representation) can be realized by a single memory chip or by various ones. They can be provided in various storage locations of this memory chip, and be subject to various access rights. However, they can also be realized with different memory modules, for example for security-related reasons.

It has proven advantageous for the representation of the time slot symbol to be realized with a hardware address of the radio tag that clearly identifies the radio tag, and unchangeably programmed into the memory stage. This makes it possible to reliably avoid undesirable, and even at times fraudulent, manipulations of the radio tag. Since each radio tag exhibits a distinct hardware address, even an allocation to a time slot that follows a strict and inalterable scheme can thus be established.

Aforesaid representation of the time slot symbol is especially preferably realized by the least significant bit or least significant byte of the hardware address, wherein it must be possible to image at least the number of time slots existing in the time slot cycle with this group of used bits. For example, only the least significant 8 bits or one byte are required given 256 time slots, and only the least significant 7 bits of the hardware address in the case of 128 time slots. In this conjunction, let it also be noted that it is advantageous for the number of time slots to correspond to a power of 2.

Let it be noted that the representation of the time slot symbol or the time slot symbol itself can also be comprised of a combination of the hardware address mentioned above and a preprogrammed other value.

The radio tag is designed to check whether a time slot symbol known to it corresponds with one present upon receiving the synchronization data signal. For example, the check can take place with the assistance of an algorithm, which delivers a check result on a processor of the radio tag while running software that describes the algorithm. For example, the algorithm can convert the received time slot symbol into the representation known to the radio tag, and then perform a comparison. However, the radio tag can also proceed in an opposite manner from the representation known to the radio tag and convert into a time slot symbol to be expected, and then compare the received time slot symbol to the expected one. However, it is advantageous for a simple comparison to be performed between two binary coded symbols, for example, since this can take place very quickly and with a relatively low power demand at the processor level in a simple registry comparison.

A distinct identification defined in the system beforehand can basically be used for each time slot. However, it has proven to be especially advantageous that the communication station be designed for generating the time slot symbol as the consecutive number ("also slot ID") of the respective time slot corresponding to its appearance in the sequence of time slots in the time slot cycle. In each time slot cycle, then, the number 1 is allocated to the first time slot, the number 2 to the second time slot, and so on. As a result, a time slot symbol can be generated in the easiest possible manner without using complicated algorithms, which also brings with it minimal data traffic during the transmission of data from the communication station to the radio tag. Only a single data packet must be sent out for use in synchronization. Therefore, the total data volume available per time slot or also per time slot cycle is barely influenced by the transmission of the time slot symbol. For this reason, channel assignment is optimized, because the number of data packets per time slot or also per time slot cycle that is required for synchronization is as low as possible. The number of time slots encountered in the time slot cycle ultimately determines the number of bits that are required for generating the respective number for the time slot (i.e., for its numeration) and comprise the data packet needed for synchronization. Because each bit can indicate two states, it is advantageous for the number of time slots per time cycle to be a power of 2. As a consequence, the time required for receiving the time slot symbol can be correspondingly brief, which reflects positively on the energy balance of the radio tag. In particular when parts of the hardware address on the side of the radio tag are used as a representation of the time slot symbol known to the radio tag, the check for agreement between the received and stored time slot symbol can be performed quickly and easily. The radio tags synchronize themselves with the communication station or the time grid defined by them for the time slot communication process in the easiest possible manner based on the time slot number.

The synchronization data signal could basically consist exclusively of the time slot symbol, and other communication parameters needed for communication between the communication station and a radio tag, such as address data for addressing a tag or command data for transmitting commands, can be separated from the synchronization data signal. Since, as explained above, the time slot symbol is an extremely compact indicator for synchronizing communication in the system, it is advantageous to embed information in addition to the time slot symbol into the synchronization data signal, which will be touched upon below.

Therefore, in a further aspect of the invention, the communication station is designed to embed address data into the synchronization data signal, which can be used to individually address a number of radio tags per time slot intended for aforesaid radio tag, and the radio tag, if the received time slot symbol indicates a time slot intended for it, is designed to evaluate the synchronization data signal for the contained address data, and to check whether it is individually addressed.

Analogously to using the hardware address of a radio tag in conjunction with the time slot symbol, it is also advantageous that the communication station be designed to generate the address data utilizing one or several bits or bytes of a hardware address of the radio tag that distinctly identifies a radio tag, in particular leaving out the least significant bits or the least significant bytes. In the present system, the hardware address of the radio tag is thus used for distinctly addressing each radio tag. On the one hand, the least significant bits or least significant bytes define which time slot is intended for the radio tag. As a consequence, a relatively high number of radio tags can be allocated to precisely a single time slot, so as to remain synchronous with this time slot and also be individually addressable in this time slot. A special radio tag is now individually addressed with additional bits or bytes of the individual hardware address of this radio tag. This measure also contributes significantly to system efficiency, since the radio tag in question, since it happens to be in the active state at the time so as to receive the time slot symbol, does not have to temporarily switch into the sleep state and at a later instant in the present time slot switch back into the active state to check whether address data are present. Rather, it becomes evident for all radio tags simultaneously listening to the synchronization data in this relatively short phase of the active state whether they are addressed or not.

Analogously to the aforesaid about embedding address data, system efficiency is also bolstered significantly if the communication station is designed to embed command data into the synchronization data signal, with which a command can be transmitted to a radio tag in a time slot intended for aforesaid radio tag, and the radio tag, if the received time slot symbol indicates a time slot intended for it, is designed to evaluate the synchronization data signal for the contained command data and to execute the command. For example, a command can be transmitted to all radio tags allocated to a specific time slot without individual addressing, and is then executed by a relatively large group of radio tags.

The radio tag could basically already perform a standardized (predefined) task by recognizing its individual addressing without having to receive an explicit command. However, it has proven especially advantageous that address data be transmitted for addressing an individual radio tag and command data be transmitted for sending a command to this individual radio tag, and that the radio tag be designed to evaluate the command data and execute the command when individually addressed with the help of the address data. As a consequence, a command for a single radio tag can be transmitted in a sometimes relatively large group of radio tags.

In another aspect of the invention, it is advantageous that the radio tag be designed to execute a command as a single time slot command, and conclude the executed command within a single time slot in which the command was received. This permits a rapid and compact handling of jobs, wherein the jobs are brought to the radio tag via the communication station. For example, such single time slot commands can be a so-called "PING" command, which is only used to check whether a specific radio tag exists, or an internal processing command, which causes as little outgoing data traffic as possible, e.g., a switching command to switch from one memory page to another memory page. A memory page is a logical area (an address area) in the memory in which data are deposited or stored, for example for an image. The radio tag transmits no data for processing (e.g., data used for display purposes with a monitor, etc.) to the radio tag with the single time slot command, but rather only commands that lead to an internal processing of data or prompt the radio tag to transmit information to the communication station.

During completion of the executed command, it has proven advantageous in this conjunction that the radio tag be designed to generate confirmation data and deliver the confirmation data in the time slot in which the command was received. As a result, even data traffic owing to the confirmation remains confined to the time slot in which the command was transmitted. Subsequent time slots remain unburdened in terms of data, which has a positive effect on system performance.

A radio tag for delivering the confirmation data can further be formed in a first part (e.g., the first half or first third) of the time slot, which is chronologically localized after the synchronization data signal, and leaves an ensuing second part of the time slot untouched prior to the appearance of the synchronization data signal of the following time slot. This structural or chronological division of the time slot accounts for the circumstance that confirmation data often require only a short transmission time, so that the remaining, specifically the second part (e.g., the second half or the second and third third) of the time slot in question is freely available for further data traffic.

At this juncture, let it be noted in very general terms that the duration of the second part of the time slot need not be defined by a fixed, set value, but rather can be dynamically derived from the respective configuration or usage of the time slot.

In a system in which 256 time slots each measuring 58.6 milliseconds exist during a time slot cycle of 15 seconds, for example, 2 to 5 radio tags per time slot can be individually addressed without any problem, and individual tasks with a single time slot command can be delegated thereto. For example, if several radio tags per time slot are assigned a task, so that it is expected that all of these radio tags will report with aforesaid confirmation data in the present time slot, it is advantageous that each radio tag follow an ordering principle. When several radio tags are addressed with the help of the address data, the radio tag is to this end designed to evaluate not just its own address, but also those of the other addressed radio tag(s), and deliver its confirmation data within a time window provided for delivering the confirmation data at the instant corresponding to the sequence in the group of addressed radio tags ascertained for it by the determined addresses. Since the communication station as the assigner of the tasks has knowledge of the addressed radio tag, only minimal data traffic is necessary for transmitting the confirmation data, as the communication station complying with this ordering principle knows exactly in which sequence, and hence at which instant or during which duration, the involved radio tags transmit its confirmation data.

In order to also transmit larger amounts of data between the communication station and a radio tag, for whose transmission the duration of a time slot would not suffice, the radio tag is designed to execute a command as a multiple time slot command over several time slots. Such commands can be processed in time slots directly adjoining each other or in time slots that are not directly adjacent. For example, a constituent of the command can encompass the number of time slots to be used, or also the identification of the time slots or even time slot groups to be used. The used time slots can be limited to a time slot cycle, or localized so as to span several time slot cycles. From the standpoint of the radio tag, such multiple time slot commands can involve downloading a larger amount of data from the communication station, or also uploading such amounts of data to the communication station. Analogously to the single time slot command, the multiple time slot command also does not transmit any data for processing (e.g., data used for display purposes with a monitor) via the radio tag to the ratio tag, but rather only commands that potentially lead to the internal processing of data and/or prompt the radio tag to receive data or transmit data at a later instant. After the multiple time slot command has been received, the radio tag can again switch to its energy-saving sleep state, and thereupon switch to the state in an autonomously time-controlled manner at the instant when data is being transmitted to it. Within the framework of data transmission, there is now no need for renewed command communication, in particular no new addressing of the radio tag either, since the communication station already defined the systematics behind data transmission to the radio tag beforehand by relaying the multiple time slot command. In a radio tag with a display, for example, the instant at which the radio tag is addressed for receiving data to be displayed is thus completely decoupled in terms of time from the actual instant that the data to be displayed are transmitted. The transmission of data to be displayed can be initiated in the current or some other time slot at one instant. The transmission of data to be displayed can extend over various time slots of a time slot cycle, or even over several time slot cycles.

If the multiple time slot command relates to a data transmission from the communication station to the radio tag, it is advantageous that the communication station be designed to transmit the overall data divided into several time slots, wherein one or more data packet per time slot is transmitted as part of the overall data, and the respective time slot uses a second part of the time slot adjoining the first part of the time slot for data transmission. Analogously to the explanations for the single time slot command, only the second part (e.g., the second half) of the time slot is used in the present case, so as to leave the other, specifically the first part of the time slot untouched for other activities. The same also applies mutatis mutandis for data transmission from the radio tag to the communication station.

In order to indicate to the communication partner that, in a series of time slots required for processing the multiple time slot command, a partial task is processed in the respective time slot, it is advantageous that the radio tag be designed to generate and deliver partial confirmation data in each time slot in which the multiple time slot command is executed.

In an especially preferred embodiment of the system, the radio tag is designed to deliver the partial confirmation data in the aforesaid second part subsequent to the received data packet and prior to the end of the respective time slot. As a result, the entire data traffic caused by the multiple time slot command is combined into the second part of the time window.

The communication station for receiving and processing the confirmation data in a reception time window provided for this purpose is also designed based upon the configuration of the radio tags involved in the system. Therefore, confirmation data for the single time slot command are received in the reception window corresponding to the first part of the respective time slot, and confirmation data for the multiple time slot command are received in the reception window corresponding to the second part of the respective time slot.

In a preferred embodiment of the system, the options described above for processing commands are combined, so that the communication station is designed to address a second radio tag with the help of the address data for a time slot provided for executing a multiple time slot command via a first radio tag, and transmit a single time slot command to the second radio tag with the help of the command data. In addition to transmitting larger quantities of data between the communication station and first radio tag, this also enables the assignment of activities or tasks to a second radio tag that only yield a low data volume during radio communication with the communication device. Data transmission is here handled with the respective radio tag in different parts of the respective time slot.

In another aspect of the system, the communication station is designed to use a command for instructing a radio tag in the time slot intended for it about another wakeup instant that does not correspond to a time slot usually intended for it, so that the radio tag is available in a time slot other than its usual one in the time slot communication process for data transmission with the communication station. Complementarily thereto, the radio tag is also designed to process this command, and switch into the active state at the wakeup instant imposed by the communication station. This measure is important when communication with a specific radio tag is forced by the communication station with a high (highest) priority. The radio tag in question now synchronizes itself with the help of the time slot symbol, which denotes a time slot usually not intended for it. After the job received in this unusual time slot has been processed, the radio tag in question again orients itself to the time slot usual for it, and once it has synchronized itself again, is ready for communication with the communication station in the synchronous state.

In order to enable an independent search for a communication station, the radio tag is designed to perform multiple checks for a timespan corresponding to the duration of the time slot cycle, in particular extended by a portion of said duration, so as to determine whether a synchronization data signal can be received, and in the absence of the synchronization data signal, to change the radio channel and perform the reception check once more. Since each communication station occupies a different radio channel, the absence of a synchronization data signal for a search day means either that no communication station exists for the radio channel in question, or that such a communication station lies outside of its range, so that a search must be performed for a different communication station. This process can be continued until such time as an option for communicating with the communication station has been found, and the radio tag was registered there, after which it is available in the system.

This search for a communication station can be simplified by designing the radio tag to confine a search for a synchronization data signal to a group of predetermined radio channels, in particular to those radio channels that were transmitted in advance by a communication station when the radio tag was connected with this communication station. This measure makes sense for a radio tag to be newly integrated into the system, but is especially preferred for an already integrated radio tag that was moved, and as a result of being moved, severed the communication link with its communication station. Being limited to known radio channels is an energy-saving method, and also helps avoid collisions with radio channels that are predominantly occupied by other devices, such as a conventional WLAN (wireless local area network).

In order to make installing a new communication station in an existing system as easy and automatic as possible, it is advantageous that the communication station be designed to check all available radio channels during its startup, especially those preprogrammed for its operation, to determine whether the respective radio channel is being used by another communication station, or whether the respective radio channel is not in use, and given such an unused radio channel, to use this radio channel for communicating with radio tags that are or will be assigned to it. An already occupied radio channel can be recognized by virtue of the fact that the synchronization data signal of another communication device appears in the radio channel.

A system according to the invention can exhibit a plurality of communication stations, for example which are spatially localized at various locations, and each communication station can have assigned to it a group of radio tags via the selection of the radio channel allocated to the communication station. As a consequence, groups of radio tags can be easily and robustly managed in the system, wherein the same time slot communication process is used for each group of radio tags, but in channels varying from group to group.

In a preferred embodiment of the system, the radio tag exhibits a display unit for reproducing an image, wherein the image is structured in image planes, and each image plane is represented by image plane data, wherein the radio tag is designed to individually receive the image plane data and put together the image by superposing the image planes, and wherein the communication station is designed to transmit the respective image plane data during a time slot-overlapping communication with the radio tag. The advantage associated with this measure is that only the image plane in which changes arise is to be selectively transmitted by the communication station to a radio tag. This measure contributes significantly to system and energy efficiency, because the quantity of data to be transmitted is relatively small relative to the quantity of data that would have to be transmitted for the entire image contents. In addition, the compression of image data for each image plane to be transmitted can be optimized, so that the quantity of data to be transmitted can be minimized. This is possible because an image plane to be transmitted usually incorporates large "white" or "transparent" areas for which a very high compression rate is achieved. Since the quantity of data to be transmitted is consequently reduced to the absolute minimum in order to update an image, this measure has an extremely advantageous effect on the service life of the radio tag, because its energy demand or consumption is held low by the least possible activity.

In this context, the radio tag can be designed to change an existing image by receiving at least one single new image plane of the image and generating the new appearance of the image by replacing an already existing image plane of the image with the image plane just received. Use can here be made of the commands discussed above. For example, the image data of an image plane can be downloaded from the communication station to the radio tag using a multiple time window command, in which the image data of the image plane in question are stored in a new memory page in the radio tag. As soon as downloading is complete, a single time slot command can be executed to switch from another memory page used previously to create the aforesaid image plane of the image to the new memory page, so as to use the aforesaid image plane for putting together the image with its other image planes.

According to a preferred exemplary embodiment, the radio tag is designed to process images in which the following meanings are ascribed to the image planes, specifically: first or second frequency of changes in image contents; first or second color of image contents; first or second information category of image contents. As a result, implementations adjusted to the respective area of application for the system can be realized, wherein combinations of meanings for the planes are also possible. More than two image planes are also possible, for example three, four or five image planes.

In one such preferred exemplary embodiment, the system realizes an electronic price display system, and a display unit of the radio tag serves to display product or price information, etc.

In all cases where a display unit is used, the display unit can be realized with LCD technology, for example, but preferably also with electronic ink technology (also referred to as E ink as a synonym for electronic paper).

In another aspect of the system, the radio tag is designed to execute the switch from the sleep state into the active state at a wakeup instant with a lead time prior to the appearance of the synchronization data signal. This measure ensures that the radio tag as a whole, or, formulated differently, all of its components necessary for receiving and processing the synchronization data signal, are fully operational, thereby avoiding a partial reception of the synchronization data signal, which could then with a high degree of probability not be logically evaluated.

The duration for the lead time can here be selected so as to measure a first fraction of the time slot duration of a time slot. For example, it can measure between 0.1% and 10% of the duration of the time slot.

In another aspect of the system, the radio tag is designed to assume an active state during a reception duration that exceeds a transmission duration of the synchronization data signal. The advantage to this measure is that it ensures that the entire synchronization data signal can be reliably received. The current reception duration to be used can be fixedly set for all reception processes in the synchronous state. However, the duration of the active state can also be dynamically adjusted to the respective drift based on the drift in the time base of the radio tag determined using the appearance of the synchronization data signal, if necessary to include the aforementioned lead time. The reception duration can also be limited via the detection of the disappearance of the synchronization data signal.

In order to ensure optimal reception conditions, the radio tag in such a system can also be designed to maintain the active state assumed for receiving the synchronization data signal for a follow-up time after receiving the synchronization data signal. For example, the follow-up time can be defined by the predefined duration of the active state, or be adjusted according to the current drift or reception states, if necessary even dynamically.

The duration of the follow-up time can here be selected so that the follow-up time measures a second fraction of the duration of a time slot. For example, it can measure between 0.1% and 10% of the duration of the time slot. The duration of the follow-up time can be identical to the duration of the lead time, or even differ from the latter.

It has proven especially advantageous that the communication station be designed to send out the synchronization data signal at the beginning of the respective time slot. This measure ensures that the beginning of a time slot can be very precisely identified for the radio tag, that the drift of the internal time base of the radio tag can already be compensated at the beginning of the time slot, and consequently that all additional activities of the radio tag can take place within the respective time slot given the best possible synchronism with the time base of the communication station, and that the complete remaining length of the time slot is available for aforesaid additional activities.

In order to have communication between the communication station and a radio tag be as structured and yet flexible as possible, it has proven advantageous that the communication station be designed to embed confirmation time data into the synchronization data signal, which can be used to determine a confirmation instant within the time slot at which confirmation data are expected from the radio tag, and that the radio tag be designed to deliver the confirmation data at the specified instant. This is advantageous in particular when several radio tags in a time slot are addressed, and an individual confirmation instant is communicated for all. After the synchronization data signal has been received, for example, each of the radio tags can then execute a command, switch into the energy-saving sleep state, and only switch back into the active state at the activation instant individually determined for it and send out its activation data, so as to then switch back into the sleep state again as quickly as possible. The activation instant already determined in the synchronization data signal thus represents a measure that improves the energy efficiency of the radio tag, as well as a measure for avoiding collisions, thereby exerting a lasting effect on its service life. The activation time data can indicate an absolute instant in the time slot measured from its start, or a retention time in the sleep state, e.g., in relation to a preceding event, for example, the end of the synchronization data signal, which can be recognized in the radio tag, or the end of the active state.

Another aspect of the invention relates to allocating a plurality of the radio tags to a plurality of communication stations. In order to obtain as balanced a distribution of allocations as possible between the radio tag and the communication stations, it has proven advantageous that a data processing device, e.g., a server, be designed to decide which of the radio tags can connect to which communication station. The basis for this decision can be an already existing distribution of connections in the system, which must be optimized from the standpoint of newly incoming radio tags. However, a fixedly prescribed connection scheme can also be present, which was defined in advance and must be realized.

In order to enable as dynamic a system as possible, it can be advantageous that a data processing device, e.g., a server, be designed to prompt a radio tag to end an existing connection with one of the communication stations and enter into a connection with another communication station. The server can then react to an unbalanced distribution of radio tags, and proactively influence and change the allocation of radio tags to communication stations to realize an optimal load distribution (load balancing).

These and other aspects of the invention may be gleaned from the figures described below.

BRIEF DESCRIPTION OF THE FIGURES

The invention will be explained once again in more detail below with reference to the attached figures based on exemplary embodiments, with the invention not being confined to the latter. The same components on the different figures are marked with identical reference numbers. Schematically shown on.

DESCRIPTION OF THE EXEMPLARY EMBODIMENTS

Figure 1:
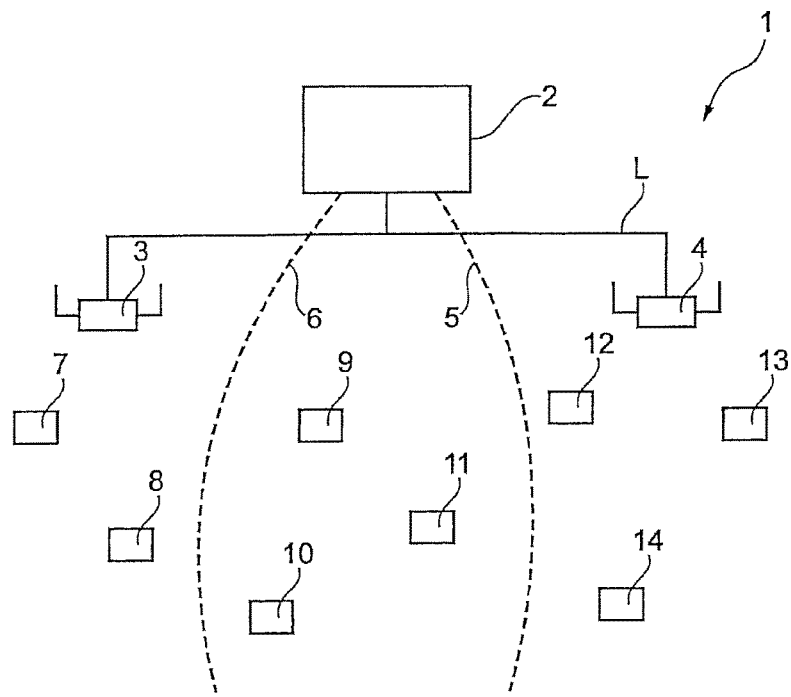
FIG. 1 is a system according to the invention.

Shown on FIG. 1 as a system 1 according to the invention for communication based on a time slot communication process is an electronic price display system, which is installed on the premises of a retail establishment. For the sake of clarity, it was decided not to show the premises and how they were set up on the figures. The system 1 exhibits a server 2, a first and a second communication station 3 and 4 (hereinafter abbreviated to station), along with a number of eight radio tags 7-14 (hereinafter abbreviated to ESL for electronic shelf label). The server is accommodated in office premises, and connected with the stations 3 and 4 by a wired communication line (LAN) L. Stations 3 and 4 are in contact with ESL 7-14 via radio signals. Stations 3 and 4 are secured to the ceiling at different locations in a salesroom. ESL 7-14 are secured to shelves corresponding to products for which price and product information is displayed by means of ESL 7-14. The product information is transmitted by server 2 to stations 3, 4, and from there communicated individually to the separate ESL 7-14.

Each station 3, 4 covers a radio range, wherein a first radio range limit 5 of station 3 and a second radio range limit 6 of station 4 are regionally denoted. The radio ranges exhibit an overlapping region, in which ESL 9-11 are located.

Figure 2:
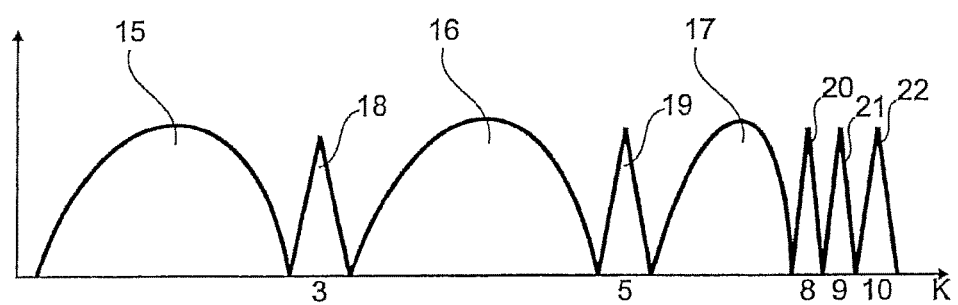
FIG. 2 is a distribution of radio channels for the system.

When starting up the system 1, stations 3, 4 are first started in sequence. Each station 3 and 34 knows the radio channels preferred for operating the system 1, with the channel numbers being 3, 5, 8, 9 and 10. This is shown on FIG. 2, which depicts various frequency bands 15-22 over channel numbers K. Frequency bands 15, 16 and 17 are available for operating a conventional WLAN. The frequency bands 18, 19, 20-22 preferred for operating the system 1 correspond to channel numbers 3, 5, 8-10, and do not overlap WLAN frequency bands 15-17. Station 3 automatically selected the radio channel with channel number 3, because the latter was checked first to see whether it was already occupied by another station. Station 4 automatically selected the radio channel with channel number 5, because, while checking for free radio channels, it determined that the radio channel was already occupied with channel number 3, and the next free radio channel identified was the one with channel number 5. However, the allocation of radio channels can also be fixed.

As soon as ESL 7-14 have been introduced into the respective radio range of station 3 or 4, they determine that radio signals of the respective stations 3 or 4 exist in one or several radio channels. ESL 7 and 8 establish a connection to the first station 3. ESL 12-14 establish a connection to the second station 4. It is determined for ESL 9-11 that both stations 3 and 4 are available for all of them. Each ESL 9-10 now checks the reception quality of the radio signals received by the respective station 3, 4, and decides on the station 3 or 4 for which the best reception quality was determined, so as to establish a connection with it in the respective radio channel (channel number 3 or 5). However, this decision-making process can also be performed by stations 3 and 4, wherein the stations check the respective reception quality of a communication with ESL 9-11, and agree among each other as to which of them will enter into a connection with which of the ESL 9-11, since more favorable communication conditions are present for the respective ESL 9-11. However, the job of deciding on the allocation between ESL 9-11 and stations 3, 4 can also be assigned to the server 2, since it is in contact with stations 3, 4. Within the framework of building the connection between the respective ESL 7-14, then, radio channels are first selected (also referred to as "channel scan"), the reception quality is evaluated on the respective radio channel as needed, and then distinct hardware addresses of ESL 7-14 are transmitted to the station 3, 4 selected for communication. As a result, each station 3, 4 knows the respective ESL 7-14 allocated to it. This first allocation between the station 3, 4 and ESL 7-14 is relayed to the server 2.

Subsequently, a second allocation is established between each ESL 7-14 and exactly one product. The server ultimately learns where in the salesroom, on which shelf and in which shelf position the respective ESL 7-14 is located (or should be located), because it also knows the corresponding position of the products, which is represented by means of a planogram.

Figure 3:
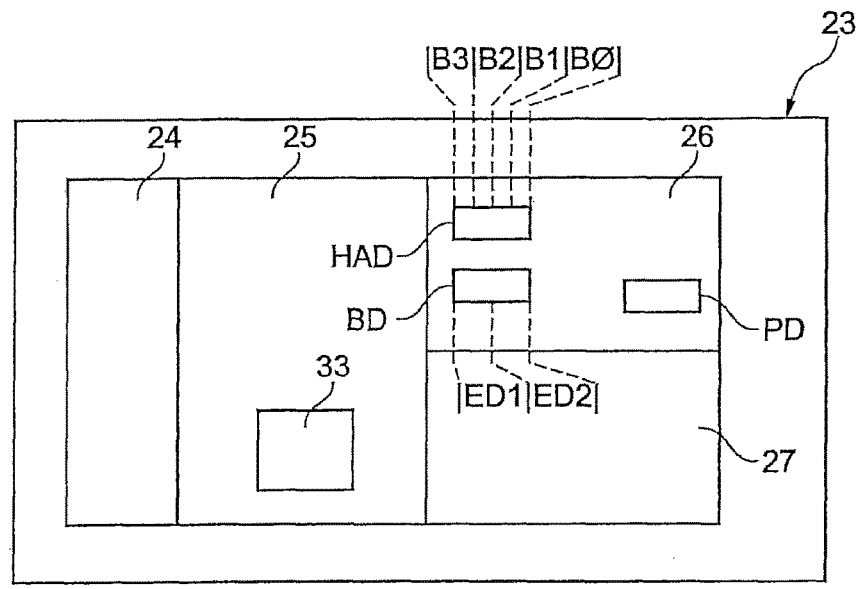
FIG. 3 is a block diagram of an electronic price display sign.

FIG. 3 shows a block diagram of the ESL 7 as representative for the ESL 7-14 used in the system, which all have an identical structural design. ESL 7 exhibits a radio module 24, a processor 25 for processing data, controlling operating states and providing functions, a memory 26 for storing data and programs, as well as a display 27 realized in energy-saving electronic ink technology for displaying product information. The radio module 24 is used for radio-based communication with the stations 3 or 4, wherein reception data are generated out of received radio signals, and relayed to the processor 25, or transmitted data relayed by the processor 25 are converted into radio signals. The data stored in the memory 26 can be allocated to both the processor 25 and the display 27. The selected depiction also does not differentiate between what type of memory (ROM, EEPROM, RAM, etc.) is involved, or how the memory 26 is logically or physically allocated to the processor 25 and/or the display 27. In the selected depiction, it was also decided not to show connections, such as signal and/or data lines between functional blocks 24-27, or the energy storage device (a battery in the present case).

The memory 26 is used to store image data BD for generating an image with the help of the display 27, wherein the image data BD indicate a first image plane of the image with first plane data ED1 and a second image plane of the image with second plane data ED2, hardware address data HAD for indicating the hardware address of the ESL, along with parameter data PD relating to the parameterization of the time slot communication process. Let it be mentioned at this juncture that other image planes can also be present.

The hardware address data HAD encompass four bytes B3, B2, B1, B0, wherein B0 is the least significant byte of the hardware address.

The processor 25 is used to combine the various plane data ED1 and ED2 into the entire image in ESL 7. Both the first and second plane data ED1, ED2 represent image information for each pixel. However, specific image information is defined as "transparent", "background" or "background color" for both image planes. For this reason, the individual image planes can be placed one on top of the other pixel for pixel, i.e., the overall image can be assembled by superposing the image contents onto identical coordinates of the pixels of various image planes. The images are present in the bitmap format, but can also be present in other formats, such as JPG, etc.

Figure 4:
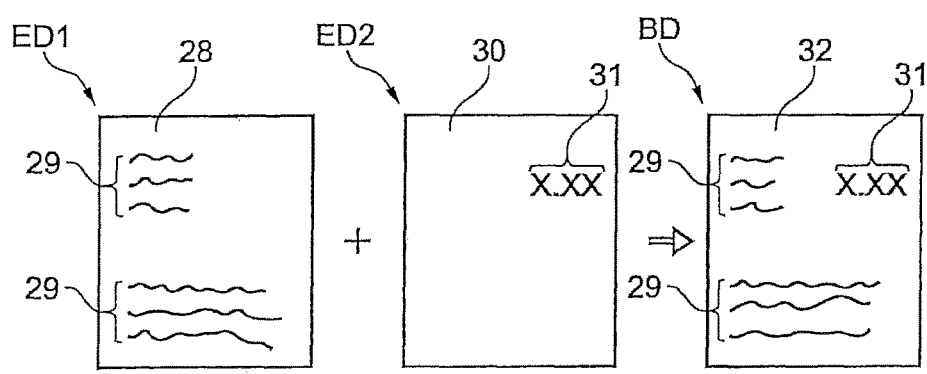
FIG. 4 is an assembly of an image.

This image structure is schematically depicted on FIG. 4. A first image plane 28 represented by the first plane data ED1 essentially contains static image information 29 about a product, wherein this static image information is only changed if a different product is allocated to ESL 7. The static image information 29 relates to text that describes the product, for example. All other image areas are defined as "transparent". A second image plane 30 represented by the second plane data ED2 essentially contains dynamic image information 31, which by comparison to static image information changes relatively often, e.g., daily or even several times a day or even weekly. For example, dynamic image information 31 relates to the price of the product, or even details about the validity of an offer, e.g., the start date and end date, or even times of day or other conditions tied to the offer. All other image areas are defined as "transparent". An overall image 32 represented by image data BD that was generated by placing each pixel of the first image plane 28 over a pixel of the second image plane 30 corresponding precisely thereto shows both the static and dynamic image information 29, 32, and the remaining areas in between characterized as "transparent".

In ESL 7, all the image data BD can be received at one time in a compressed form, decompressed and stored in the memory 26. For example, this can take place during an initial transmission of the overall image. However, the process is relatively long, and thus results in a relatively high energy demand. Once the image exists in ESL 7, partially updating the image is more efficient, because it can be done with less energy. To this end, ESL 7 can receive the respective image plane to be updated (e.g., the second image plane 30) separately from the other image plane already stored in the memory 26 (e.g., the first image plane 28), decompress it and store it in the memory 26. The newly created second plane data ED2 are then internally accessed (switched from one memory page to another memory page) so as to rebuild the overall image 32.

ESL 7 also exhibits a time control stage 33, which can be realized as a self-contained hardware component, or at least partially with the help of the processor 25. It generates a time base typical for the ESL, and uses this time base to control the timing (entry and exit) of the states of ESL 7. For example, timing is controlled by means of timing parameters, which are inherently known to the time control stage and/or provided by the processor.

The time slot communication process used in the system 1 will be discussed below with the help of FIGS. 5-8. Only the ESL 7-9 allocated to the first stage 3 will be discussed here, wherein analogous explanations also apply to the ESL 11-14 allocated to the second station 4. Time t is plotted on the abscissa axis in the state diagrams shown on FIGS. 5-8. The states Z of the respective component in the system 1 considered in the explanation are plotted on the ordinate axis. As a consequence, the diagrams present the chronological state progression.

The uppermost sequence of states on all of FIGS. 5-8 shows the states of stage 3 characterized by ST. During a time slot cycle duration DC (e.g., 15 seconds), N time slots Z1 ... ZN (e.g., 256) of an identical time slot duration DS (e.g., approx. 58 milliseconds) are available. During the time slot cycle duration DC, the stage 3 switches between a transmitting state T and an idle state R. The transmitting state T is always assumed at the beginning of a time slot Z1 ... ZN, and maintained for a synchronization data signal duration DSD (or transmitting duration DSD of the synchronization data signal SD), in order to send the respectively applicable time slot symbol ZS1, ZS2, ... ZSN with the respective synchronization data signal SD. The consecutive number of the respective time slot Z1 ... ZN in the sequence of appearance of the time slot Z1 ... ZN is used as respective time slot cycle symbol ZS1 ... ZSN. As a consequence, the first time slot Z1 is labeled in hexadecimal notation (marked "Hex") with time slot symbol Hex 00, the second time slot Z2 with time slot symbol Hex 01, etc., and the last time slot ZN (the two hundred fifty sixth time slot in the present example) Z256 with time slot symbol Hex FF.

In the following, discussion centers on the hardware addresses of ESL 7-9, which are indicated in hexadecimal notation (most significant byte left=fourth byte B3: third byte B2: second byte B1: least significant byte right=first byte B0). The hardware addresses for ESL 7-9 would not change during the actual operation of the system 1. However, in order to discuss various aspects of the system 1 with a manageable number of ESL's, the ESL's of the system 1 are sometimes allocated different hardware addresses from figure to figure, or individual or several ESL's are even not included in the discussion.

Figure 5:
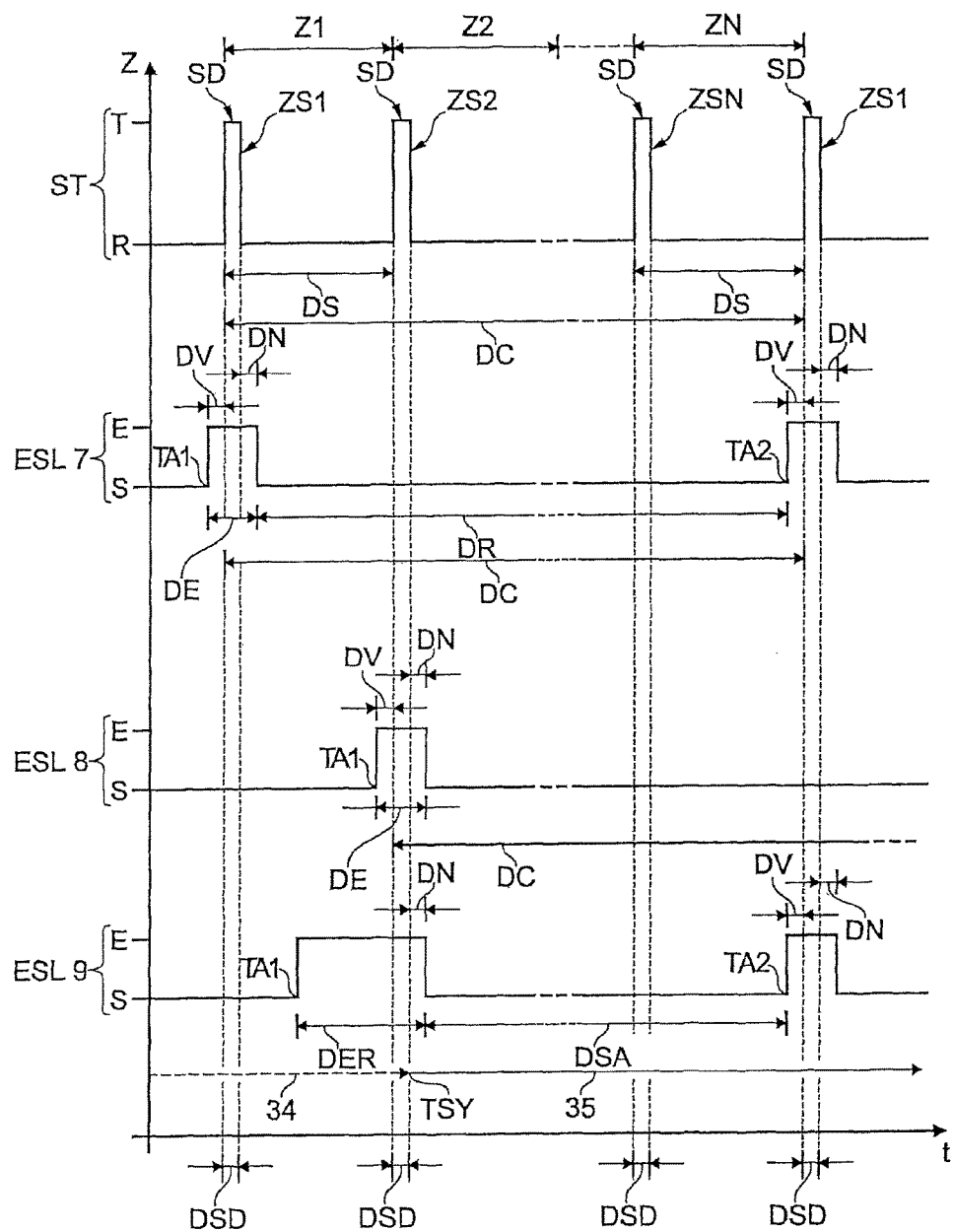
FIG. 5 is a first state diagram.

On FIG. 5, the hardware address of the first ESL 7 is Hex B2:00:01:00, of the second ESL 8 is Hex B2:00:01:01, and of the third ESL 9 is Hex B2:00:02:00. The fourth ESL 10 is left out of account.

On FIG. 6, the hardware address of the first ESL 7 is Hex B2:00:01:00, of the second ESL 8 is Hex B2:00:02:00, and of the third ESL 9 is Hex B2:00:03:00. The fourth ESL 10 is left out of account.

On FIG. 7, the hardware address of the first ESL 7 is Hex B2:00:01:00. The remaining three ESL 8-10 are left out of account.

On FIG. 8, the hardware address of the first ESL 7 is Hex B2:00:01:00, of the second ESL 8 is Hex B2:00:01:01, of the third ESL 9 is Hex B2:00:02:01, and of the fourth ESL 10 is Hex B2:00:03:01.

The least significant byte B0 is used for the respective ESL 7-10 in the system 1 to identify a time slot that appears within the framework of the time slot communication process, and is intended for the respective ESL 7-10. Except for the least significant byte B0, the remaining three bytes B1-B3 of the hardware address are used to individually address an ESL 7-10 for the time slot Z1 ... ZN intended for the respective ESL.

As shown on FIG. 5, the first ESL 7 is in a synchronous state. It wakes up from its sleep state S at a first wakeup instant TA1, and, with a relatively short lead time DV prior to the expected appearance of a synchronization data signal SD, switches into its reception-ready active state E, receives the synchronization data signal SD during a reception duration DE with the first time slot symbol ZS1 (Hex 00), compares the least significant byte B0 of its hardware address (Hex 00) with the received time slot symbol ZS1 to determine that the first time slot Z1 intended for the first ESL 7 is displayed (conformity between the bytes: B0 of the hardware address to be compared and the first time slot symbol ZS1), keeps the parameters of the time control stage 33 used for wakeup control for wakeup in the ensuing time slot cycle in order to define the new wakeup instant, and switches back into the sleep state S with a relatively short follow-up time DN, in order to wake up again as planned upon expiration of the prescribed sleep state residence time DR at the new (second) wakeup instant TA2 with aforesaid lead time VD before the first time slot cycle Z1 begins anew. The same holds true analogously for the second ESL 8, which just as the first ESL 7 is in the synchronous state.

Prior to a synchronization instant TSY, the third ESL 9 is in an asynchronous state, which is denoted by the arrow 34 with a broken line running parallel to the time axis. It awakes at a randomly selected first wakeup instant TA1, and switches from its sleep state S into the reception-ready active state E, and waits in this state until the next appearance of the synchronization data signal SD has been received, wherein the second time slot symbol ZS2 (Hex 01) is received in the present case. Based on the least significant byte B0 (Hex 00) of its hardware address, the third ESL 9 recognizes that the time slot intended for it already belongs to the past in the present time slot cycle, so that the next time slot having time slot symbol Hex 00 can only be expected in the next time slot cycle, and calculates that the currently recognized time slot Z2 lies adjacent to its original time slot Z1 by one time slot, which is referred to below as the time slot difference. In the third ESL 9, the time control stage 33 is now programmed in such a way that the new wakeup instant TA2 lies prior to the appearance of the first time slot Z1 of the ensuing time slot cycle with aforesaid lead time DV, just as for an ESL located in the synchronous state. The residence time DSA to be awaited in the sleep state S is calculated as follows: Sleep state residence time DR (in the synchronous state) minus the time slot duration DS multiplied by the time slot difference (the value 1 in the present case). As a consequence, the third ESL 9 is again in the synchronous state, as denoted by the arrow 35 with a solid line, and switches from the active state E into the sleep state S, so as to switch back into its active state E at the new wakeup instant TA2 upon expiration of the residence time DAS.

Figure 6A:
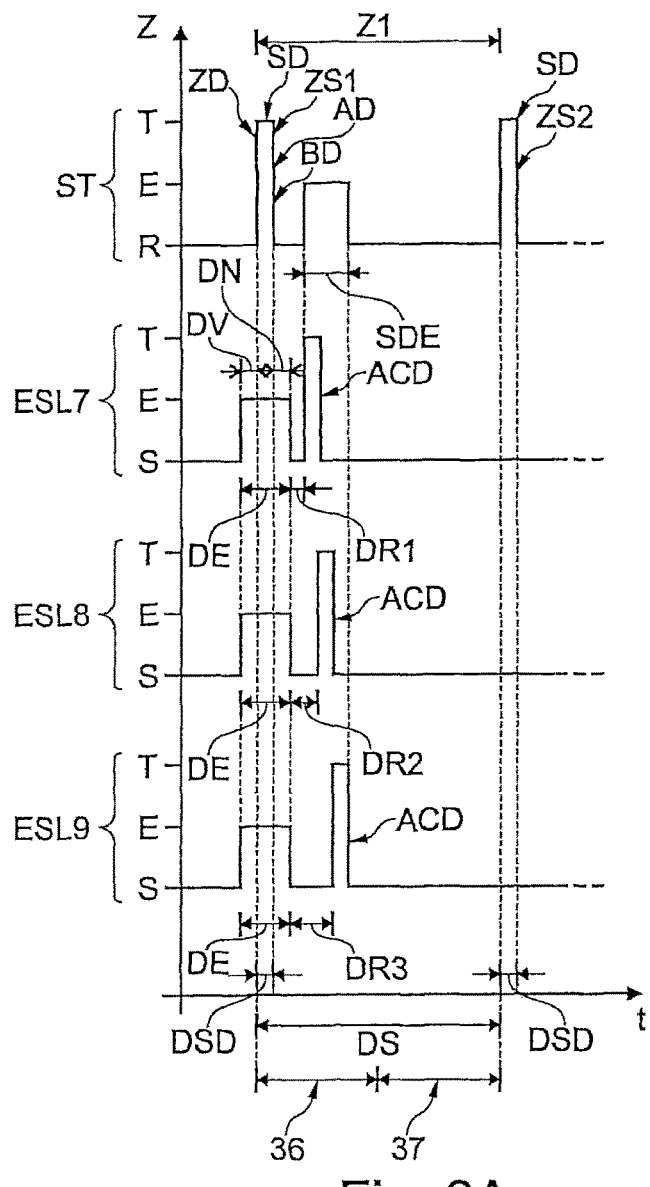
FIG. 6A is a second state diagram.
Figure 6B:
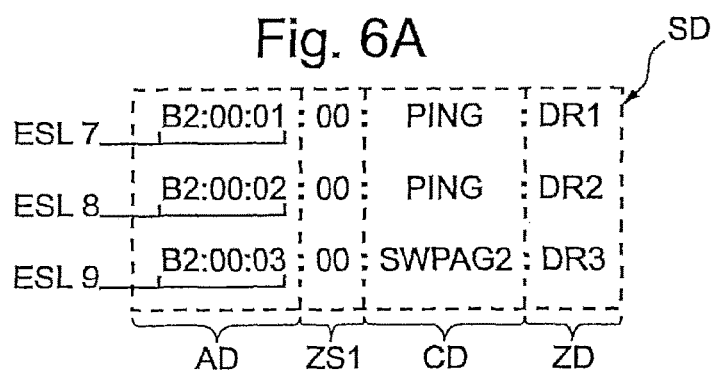
FIG. 6B is a first data structure.

FIG. 6A is drawn upon to explain the individual addressing of ESL 7-9 and individual instruction of these ESL 7-9 by means of single time slot commands. Only the first time slot Z1 embedded between two synchronization data signals SD is shown. The station 3 embeds address data AD, command data CD and confirmation time data ZD into the synchronization data signal SD of the first time slot Z1. The first ESL 7 is individually addressed using address data AD Hex B2:00:01, the second ESL 8 using address data AD Hex B2:00:02, and the third ESL 9 using address data AD Hex B2:00:03. The command data CD are used to send a "PING" command to the first ESL 7, a "PING" command to the second ESL 8 as well, and a "SWPAG2" command to the third ESL 9. These commands are single time slot commands, which are run immediately after decoded in the respective ESL 7-9 with a negligible time outlay. The two "PING" commands are used to test whether the addressed ESL 7, 8 responds with confirmation data ACD, i.e., whether it exists or even reacts and is synchronized. The "SWAPG2" command is used in the third ESL 9 to prompt a switch from a (first) current memory page (or memory page) to a second memory page (or memory page), e.g., to change the image to be shown by means of the display 27, as explained in conjunction with FIG. 4. In addition, the synchronization data signal SD is used to transmit a confirmation instant for the first ESL 7 by indicating a first rest period DR1, for the second ESL 8 by indicating a second rest period DR2, and for the third ESL 9 by indicating a third rest period DR3. The reference point for the three rest periods DR1-DR3 is always the end of the reception duration DE. The data structure transmitted via the synchronization data signal SD at the beginning of the first time slot Z1 is visualized on FIG. 6B.

Instead of the individual rest periods DR1-DR3, maximum periods for responses can also be indicated, which are derived from the total of the respective rest period DR1-DR3 and the period for delivering the confirmation data ACD.

According to FIG. 6A, all three ESL 7-9 recognize that they are synchronous, because the first time slot symbol Z1 indicates the time slot intended for them (least significant byte B0 of the hardware address is Hex 00 for all three ESL 7-9). A check of the address data AD indicates that each ESL 7-9 is individually addressed (existence of remaining three bytes B1-B3 of the respective hardware address in the address data AD); the commands intended for the respective ESL 7-9 are decoded and directly executed, and, upon expiration of the individual rest periods DR1 DR3 after the reception duration DE has ended, the individual confirmation data ACD are transmitted to the station 3, which is ready to receive the confirmation data ACD during a station reception duration SDE. The single time slot commands, to include the communication of confirmation data ACD, are completely executed in a first part 36 of the time slot Z1, so that a second part 37 is available for another task, e.g., running multiple time slot commands, which is discussed in detail on FIGS. 7 to 8.

Figure 7A:
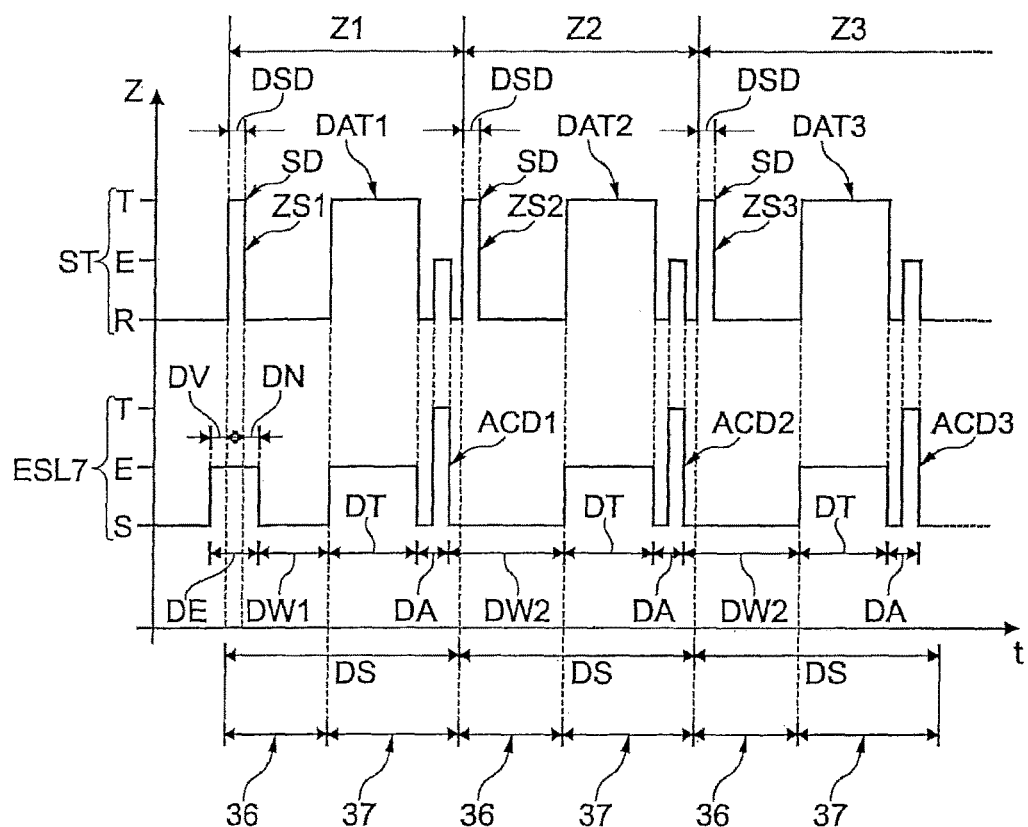
FIG. 7A is a second state diagram.
Figure 7B:
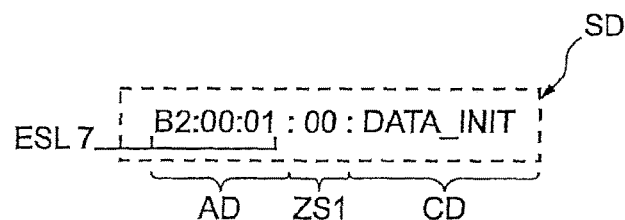
FIG. 7B is a second data structure.

FIG. 7A presents the execution of a multiple time slot command, in which the first ESL 7 receives overall data (e.g., relating to a total image to be displayed or even just an image plane of the image) divided into three data packets DAT1-DAT3 from the station 3 over three adjacent time slots Z1-Z3. The first ESL 7 recognizes its synchronous state by means of the synchronization data signal SD and, since it is individually addressed (address data Hex B2:00:01), receives and decodes a "DATA_INIT" command, which commands it to receive the three data packets DAT1-DAT3 in the aforesaid time slots Z1-Z3, and passes into the sleep state S at the end of the reception duration DE for a first waiting period DW1, wherein the first waiting period DW1 expires at the end of the first half of the time slot duration DS. At the beginning of the second part 37 of the first time slot Z1, the station 3 goes into its transmitting state T, and the first ESL 7 into its reception-ready active state E, so that it receives the first data packet DAT1 during a data transmission duration DT. It then confirms successful reception by means of partial confirmation data ACD1 during a confirmation period DA, in which the station 3 is also in the reception state E. The confirmation duration DA concludes prior to the end of the first time slot Z1. Upon expiration of the confirmation duration DA, the first ESL 7 resides in the sleep state S for a second waiting period DW2, which lasts until the end of the first part 36 of the second (ensuing) time slot Z2. At the beginning of the second part 37 of the second time slot Z2, the station 3 goes into its transmitting state T, and the first ESL 7 into its reception-ready active state E, so that it receives the second data packet DAT during a data transmission duration DT. The same holds true for the third time slot Z3, at the conclusion of which data transmission ends. Each successfully transmitted data packet DAT1-DAT3 is confirmed via the partial confirmation data ACD1-ACD3. The data structure transmitted with the synchronization data signal SD at the beginning of the first time slot Z1 is visualized on FIG. 7B.

Figure 8A:
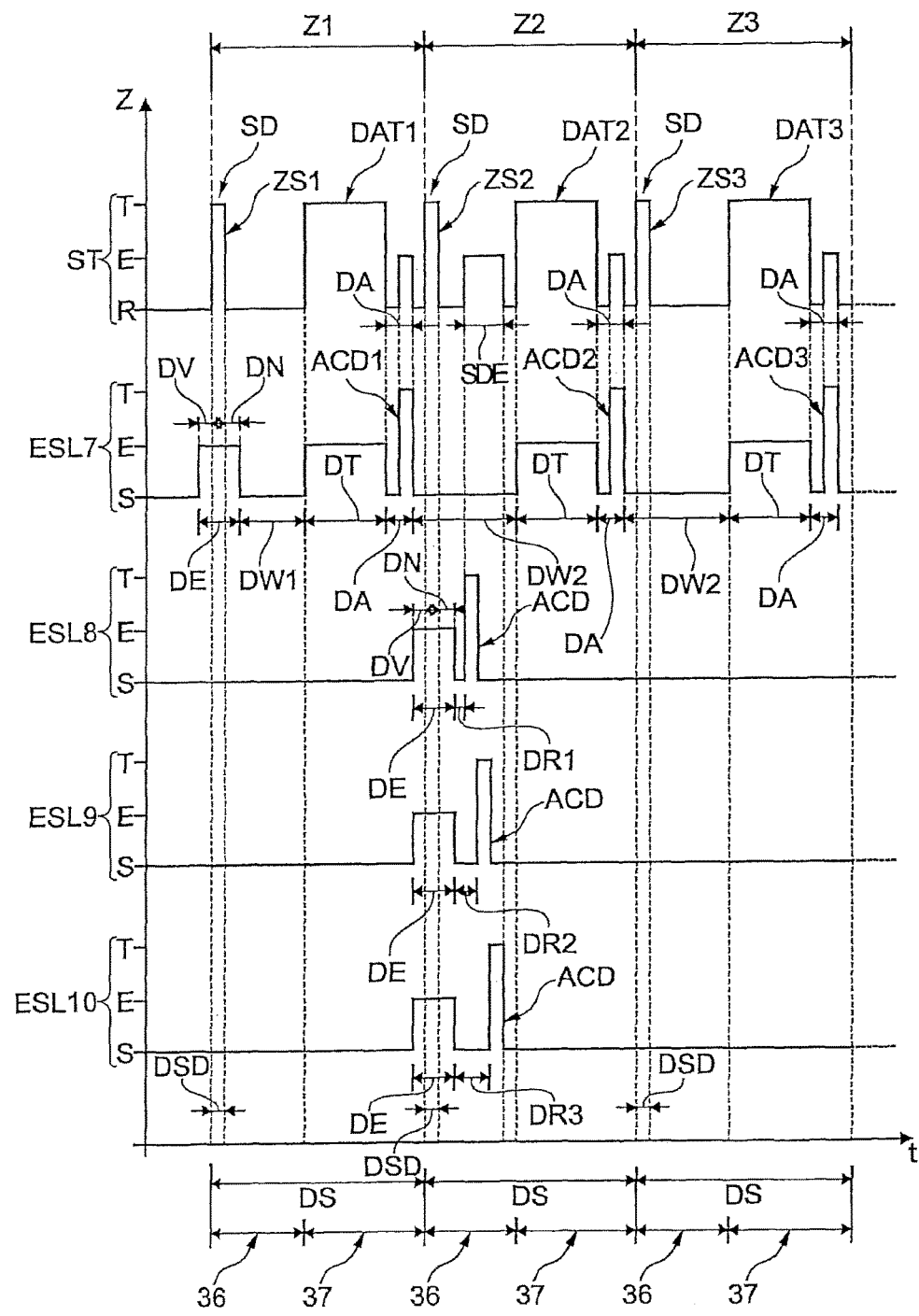
FIG. 8A is a third state diagram.
Figure 8B:
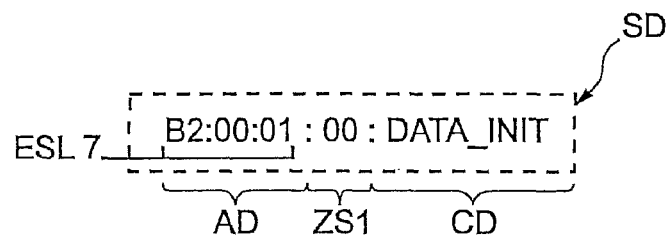
FIGS. 8B-8C is a third and fourth data structure.
Figure 8C:
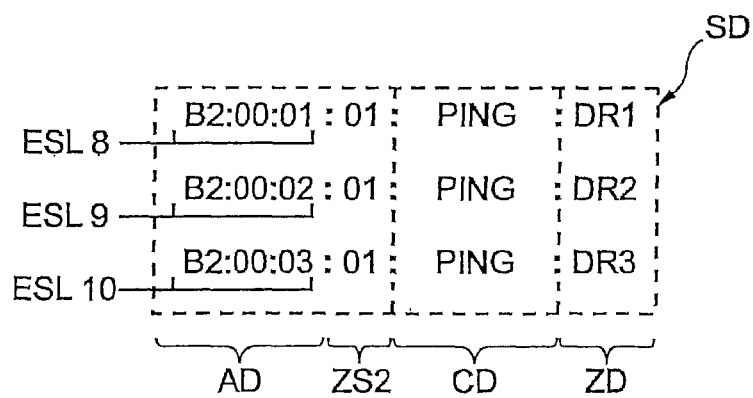

FIG. 8A is drawn upon to explain data transmission using a combination of a multiple time slot command and three single time slot commands. The first ESL 7 recognizes its synchronous state by means of the synchronization data signal SD (least significant byte B0 of the hardware address is Hex 00) and, since it is individually addressed (address data B2:00:01), receives and decodes a "DATA_INIT" command, which commands it to receive the three data packets DAT1-DAT3 in the aforesaid time slots Z1-Z3. The data structure transmitted with the synchronization data signal SD at the beginning of the first time slot Z1 is visualized on FIG. 8B. Data transmission from the station 3 to the first ESL 7 takes place analogously to the manner explained for FIG. 7A.

The three remaining ESL 8-10 recognize that they are synchronous at the beginning of the second time slot, because the second time slot symbol Z2 indicates the time slot intended for them (least significant byte B0 of the hardware address is Hex 01 for all three ESL 8-10). A check of the address data AD indicates that each ESL 8-10 is individually addressed (existence of remaining three bytes B1-B3 of the respective hardware address in the address data AD); the commands intended for the respective ESL 8-10 are decoded (in the present case three "PING" commands) and directly executed, and, upon expiration of the individual rest periods DR1 . . . DR3, the individual confirmation data ACD are transmitted to the station 3, in the manner explained on FIG. 6A. The data structure transmitted with the synchronization data signal SD at the beginning of the second time slot Z2 is visualized on FIG. 8C.

As clearly evident, the three single time slot commands along with the multiple time slot command are handled quasi-simultaneously in the second time slot T2 relative to the "time slot" time unit, since the first part 36 of the second time slot Z2 is reserved to the single time slot commands, and the second part 37 to the multiple time slot command, for purposes of the respectively required data communication. However, the allocation of the respective command type to the parts of the time slot 36, 37 can also be reversed.

Finally, let it be noted once again that the figures described in detail above only involve exemplary embodiments, which the expert can modify in a wide variety of ways without departing from the area of the invention. For the sake of completeness, let it also be stated that use of the indeterminate article "a" or "an" does not mean that the respective features cannot be present multiple times.

What is claimed:

1. A system (1), exhibiting
   - a communication station (3, 4) for communicating with a number of radio tags (7-14) in a time slot communication process, in which a number of time slots (Z1-ZN) per time slot cycle in a repeating sequence are available for communication, and each time slot (Z1-ZN) is characterized by a distinct time slot symbol (ZS1-ZSN), wherein the communication station is designed to send out a synchronization data signal (SD) exhibiting the time slot symbol (Z1-ZN) for the currently present time slot (Z1-ZN), and wherein
   - a radio tag (7-14) is designed:
   + for changing from a sleep state (S) into an active state (E) at a wakeup instant (TA1), and
   + for receiving the synchronization data signal (SD) in the active state (E) and,
   + if the received time slot symbol (ZS1-ZSN) indicates a time slot (Z1-ZN) intended for it, for defining a new wakeup instant (TA2) corresponding to the next appearance of the time slot (Z1-ZN) intended for it in a time slot cycle that follows the currently present time slot cycle, wherein
   - the radio tag (7-14) exhibits a display unit (27) for reproducing an image (32), wherein the image (32) is structured in image planes (28, 30), and each image plane (28, 30) is represented by image plane data (ED1, ED2), wherein the radio tag (7-14) is designed to individually receive the image plane data (ED1, ED2) and put together the image (32) by superposing the image planes (28, 30), and wherein
– the communication station (3, 4) is designed to transmit the respective image plane data (ED1, ED2) during a time slot-overlapping communication with the radio tag (3, 4).

2. The system (1) according to claim 1, wherein
– the radio tag (3, 4) is designed to change an existing image (32) by
+ receiving at least one single new image plane (28, 30) of the image (32) and
+ generating the new appearance of the image (32) by replacing an already existing image plane (28, 30) of the image (32) with the image plane (28, 30) just received.

3. The system (1) according to claim 1, wherein the radio tag (7-14) is designed to process images (32) in which the following meanings are ascribed to the image planes (28, 30):
  – first or second frequency (29, 30) of changes in image contents, or
  – first or second color of image contents, or
  – first or second information category of image contents.

4. The system (1) according to claim 2, wherein the radio tag (7-14) is designed to process images (32) in which the following meanings are ascribed to the image planes (28, 30):
  – first or second frequency (29, 30) of changes in image contents, or
  – first or second color of image contents, or
  – first or second information category of image contents.

5. The system (1) according to claim 1, wherein the system (1) realizes an electronic price display system, and a display unit (27) of the radio tag (7-14) serves to display product or price information, etc.

6. The system (1) according to claim 2, wherein the system (1) realizes an electronic price display system, and a display unit (27) of the radio tag (7-14) serves to display product or price information, etc.

7. The system (1) according to claim 3, wherein the system (1) realizes an electronic price display system, and a display unit (27) of the radio tag (7-14) serves to display product or price information, etc.

8. The system (1) according to claim 4, wherein the system (1) realizes an electronic price display system, and a display unit (27) of the radio tag (7-14) serves to display product or price information, etc.

\* \* \* \* \*